United States Patent
Von Sivers et al.

(10) Patent No.: US 6,241,054 B1
(45) Date of Patent: Jun. 5, 2001

(54) DISK BRAKE FOR VEHICLES

(75) Inventors: Rolf Von Sivers, Weissach-Flacht; Joachim Kappich, Bad Liebenzell; Claus Thomas, Stuttgart, all of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/352,119

(22) Filed: Jul. 13, 1999

(30) Foreign Application Priority Data

Aug. 17, 1998 (DE) .............................................. 198 37 166

(51) Int. Cl.⁷ .................................................. F16D 65/00
(52) U.S. Cl. .................................. 188/73.2; 188/218 XL; 188/73.37
(58) Field of Search .......................... 188/218 XL, 73.1, 188/73.2, 106 P, 106 F, 106 A, 250 B, 370, 70 R, 73.37

(56) References Cited

U.S. PATENT DOCUMENTS

| | | | | |
|---|---|---|---|---|
| 1,850,116 | * | 3/1932 | McGiffert et al. | 188/70 R |
| 2,465,810 | * | 3/1949 | Mac Donald et al. | 188/70 R |
| 4,114,732 | * | 9/1978 | Dunn | 188/73.2 |
| 4,130,186 | * | 12/1978 | De Gennes | 188/250 B |
| 5,542,503 | * | 8/1996 | Dunn et al. | 188/218 XL |

FOREIGN PATENT DOCUMENTS

| | | |
|---|---|---|
| 1 625 798 | 8/1970 | (DE) . |
| 25 07 264 | 9/1976 | (DE) . |
| 28 37 634 | 3/1980 | (DE) . |
| 35 39 640 | 10/1986 | (DE) . |
| 43 36 094 | 4/1995 | (DE) . |
| 195 07 102 | 9/1996 | (DE) . |
| 2 232 449 | 12/1990 | (GB) . |
| 2 314 387 | 12/1997 | (GB) . |
| 60-237234 | 11/1985 | (JP) . |
| 63-6230 * | 1/1988 | (JP) ...................................... 188/70 R |

OTHER PUBLICATIONS

Putting the Brakes on Brake Noise, Machine Design, Sep. 24, 1993, p. 26.

* cited by examiner

Primary Examiner—Robert Oberleitner
Assistant Examiner—Mariano Sy
(74) Attorney, Agent, or Firm—Evenson, McKeown, Edwards & Lenahan, P.L.L.C.

(57) ABSTRACT

A disk brake includes a brake disk which is surrounded by a caliper carrying lining devices. On the side of the lining device facing a brake lining surface, the brake disk has a concave brake disk surface. In order to at least partially reduce the noise emitted occurring during slow-down braking, the concavity of the brake disk surface and the convexity of the brake lining surface are constructed such that a noise-reducing form closure occurs.

19 Claims, 4 Drawing Sheets

DISK BRAKE FOR VEHICLES

BACKGROUND AND SUMMARY OF THE INVENTION

This application claims the priority of German patent 198 37 166.7, filed Aug. 17, 1998, the disclosure of which is expressly incorporated by reference herein.

The invention relates to a disk brake having a brake disk and a lining device which interacts with the brake disk and is held on a caliper, the brake disk having a concave brake disk surface on the side of the lining device facing a brake lining surface.

Disk brakes are well suited for a targeted deceleration of a vehicle but, during slow-down braking operations in the low system pressure range, for example, when a vehicle approaches a pedestrian crossing, a traffic light or the like, may cause noises which may have a disturbing effect on pedestrians, among others.

For avoiding a non-uniform wear of brake disks, it is known from German Patent Document DE 43 36 094 A1 to enlarge a brake disk by contouring. In one embodiment, the brake disk therefore is arched in a concave manner. By means of this construction, the described disturbing noises can hardly be avoided.

It is an object of the invention to improve the brake disk and the lining device of a disk brake such that, while the braking effect is good, noise emissions under corresponding operating conditions are at least reduced.

According to the invention, this and other objects have been achieved by a disk brake for a vehicle, comprising: a brake disk having a concave brake disk surface; a lining device supported on a caliper, said lining device having a convex brake lining surface facing said concave brake disk surface of said brake disk.

The principal advantages achieved by the invention are that, as a result of the concavity of the brake disk surface and the convexity of the brake lining surface, a centering of the two surfaces with respect to one another is caused during the braking operation. This results in a functionally appropriate form closure and reduces disturbing noises, for example, during slow-down braking at pedestrian crossings and traffic lights.

A particularly good function is achieved if the concavity of the brake disk surface is determined by a concavity factor equal to or larger than 3, as further described below. If the guiding factor F, as further described below, influencing the form closure is equal to or larger than 1.8, the low-noise interaction of the surfaces is additionally promoted. A further optimization is achieved if the effective brake lining length LW, as further described below, is dimensioned as a function of the medium friction circumference line UM of the brake disk surface and of the number of vibration nodes.

In the cross-sectional view, the concavity of the brake disk surface and the convexity of the brake lining surface is formed by one radius respectively. However, it is also possible to form the concavity and the convexity by an arbitrarily arched curve or two straight lines each extending at an obtuse angle with respect to one another. Finally, it is also contemplated to provide one or several passage ducts between the brake disks, and the wall thickness of the brake disks may vary in the radial direction.

Other objects, advantages and novel features of the present invention will become apparent from the following detailed description of the invention when considered in conjunction with the accompanying drawings.

DETAILED DESCRIPTION OF THE DRAWINGS

Figure 1:
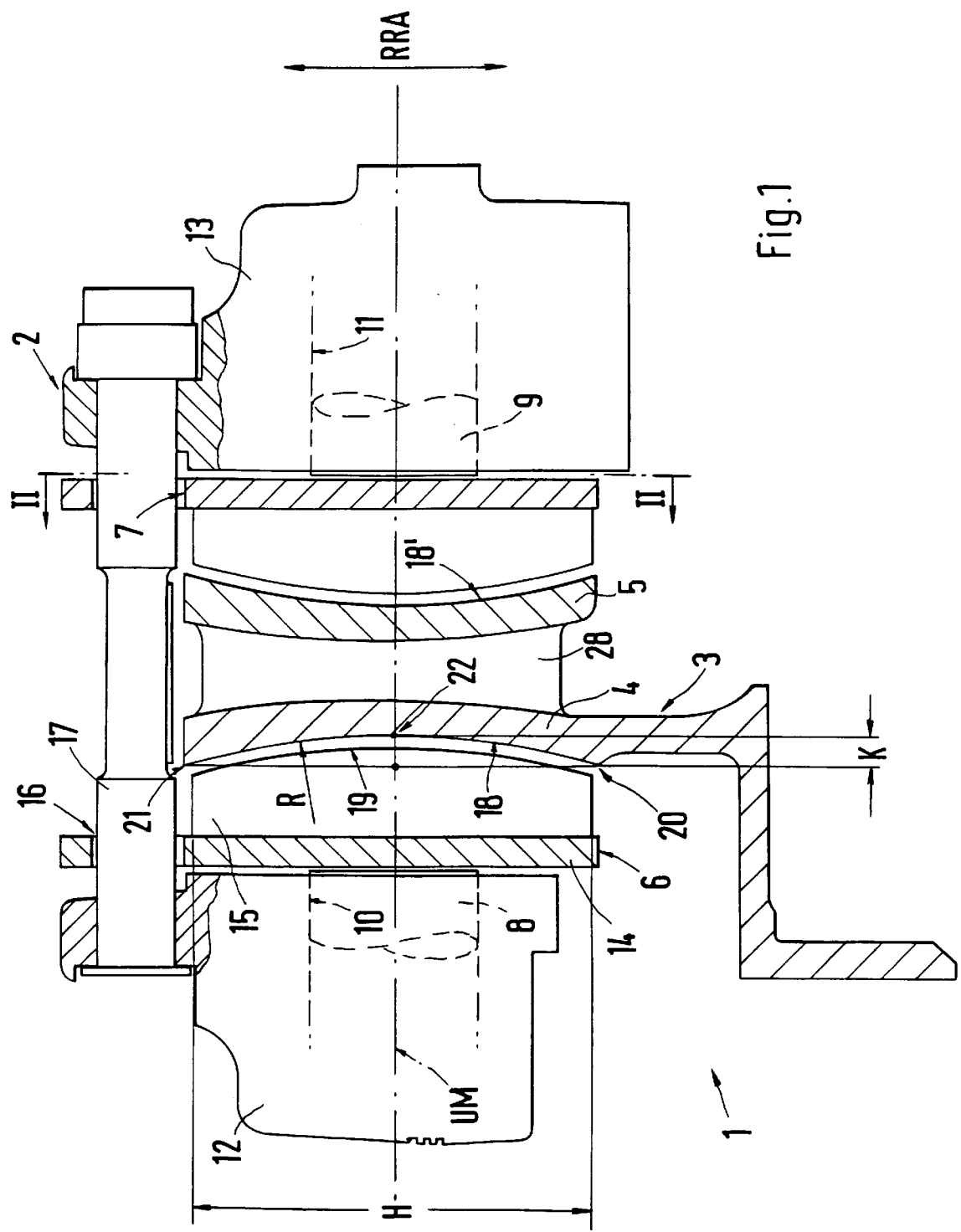
FIG. 1 is a partially sectional lateral view of a disk brake with a brake disk and a caliper with lining devices according to a preferred embodiment of the present invention.

A disk brake 1, which may be installed, for example, in a road vehicle, a rail vehicle, an airplane, or the like, comprises a caliper 2 and brake disk 3 with opposite friction ring halves 4, 5.

The caliper 2 is constructed as a so-called fixed caliper which, disposed in a floating manner on both sides of the brake disk 3, has lining devices 6, 7 which can be acted upon by way of pistons 8, 9. The pistons 8, 9 are disposed in an axially movable manner in bores 10, 11 of caliper housings 12, 13. Each lining device 6, 7 comprises a carrier 14 and a lining 15 which are fixedly connected with one another. The carrier 14 is provided with a bore 16 which surrounds a bearing bolt 17. The lining device 6, 7 are disposed on the bearing bolt 17 in a slidable manner, that is, in its axial direction.

On the side facing the lining device 6, that is, on the friction ring half 4, the brake disk 3 has a concave brake disk surface 18. A brake lining surface 19 of the lining device 6 adjacent to the brake disk surface 18 corresponds with the above-mentioned brake disk surface and therefore has a convex construction.

The concavity of the brake disk surface 18 is defined as follows by a concavity factor KF:

$$KF = \frac{K * 100}{H}$$

KF≧3 wherein K corresponds to the dimension between outer boundaries 20, 21 and the largest indentation 22 situated on a central friction circumference line UM of the brake disk surface 18 (see FIG. 2), and H corresponds to the height of the radial brake lining surface 19 (see FIG. 1).

During the braking operation, form closure occurs between the brake disk surface 18 and the brake lining surface 19. This form closure is determined by a guiding factor F which is defined as follows:

$$F = \frac{LG}{H}$$

F=≧1.8 wherein LG corresponds to the geometrical brake lining length (see FIG. 2), and H, as mentioned above, corresponds to the height H of the radial brake lining surface 19 (see FIG. 1).

Figure 2:
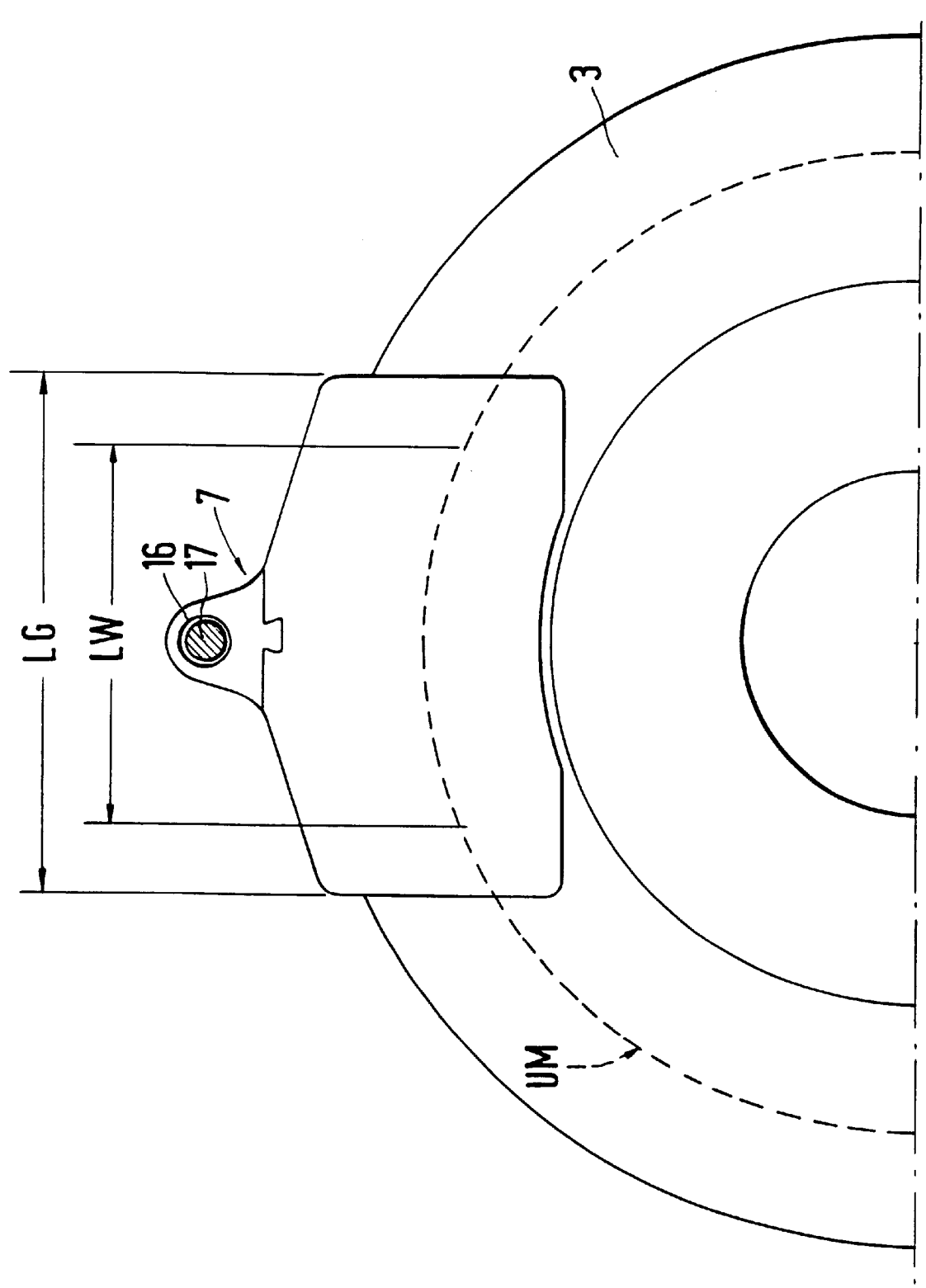
FIG. 2 is a smaller-scale sectional view according to Line II—II of FIG. 1.

Furthermore, the form closure between the brake disk surface 18 and the brake lining surface 19 can be interpreted as follows as a function of an effective brake lining length LW (FIG. 2):

$$LW \approx 0.7 * LG$$

$$LW > \frac{UM}{N}$$

wherein LG, as mentioned above, is the geometrical brake lining length (see FIG. 2); UM is the central friction circumference line of the brake disk surface (see FIG. 2); and N is the number of vibration nodes.

Figure 5:
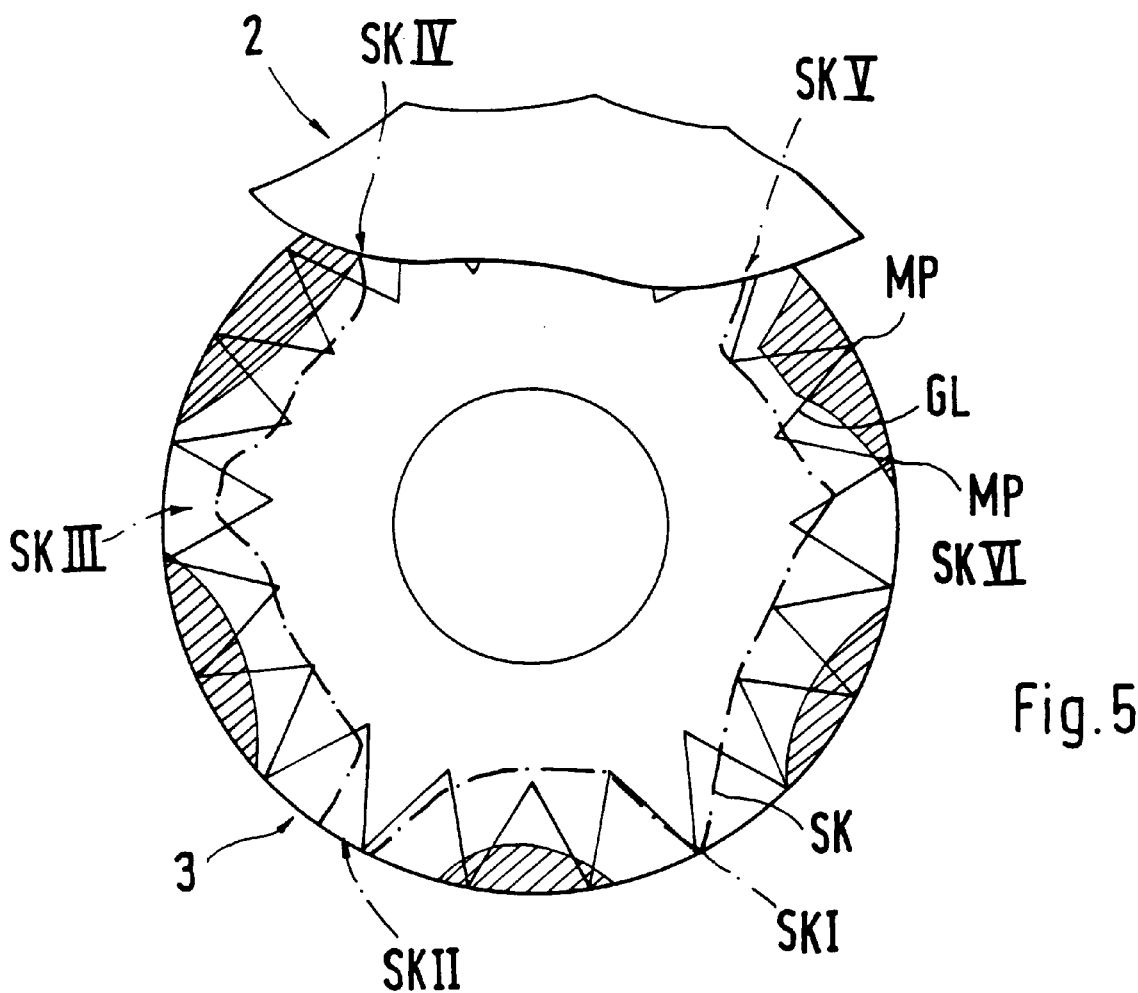
FIG. 5 is a schematic view corresponding to FIG. 2 with the representation of vibration nodes.

The number N of vibration nodes SK may be, for example, 4, 6, or 8. In FIG. 5, six vibration nodes SK I to SK VI are derived which are a function of the effective brake lining length LW. In the illustrated embodiment, LW is approximately ⅙ of the brake lining surface circumference. The largest vibration level—also called vibration bulges—of the vibration form are in each case between the vibration nodes SKI–SK VI and are hatched, the measuring points MP including grid lines GL.

Figure 3:
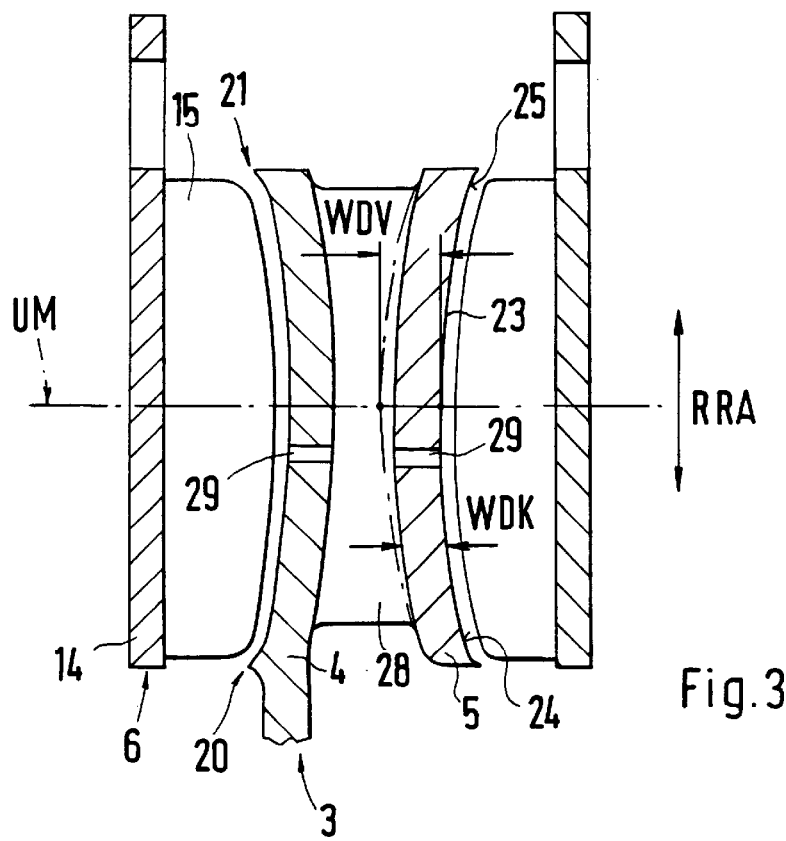
FIG. 3 is a partial view of FIG. 1.
Figure 4:
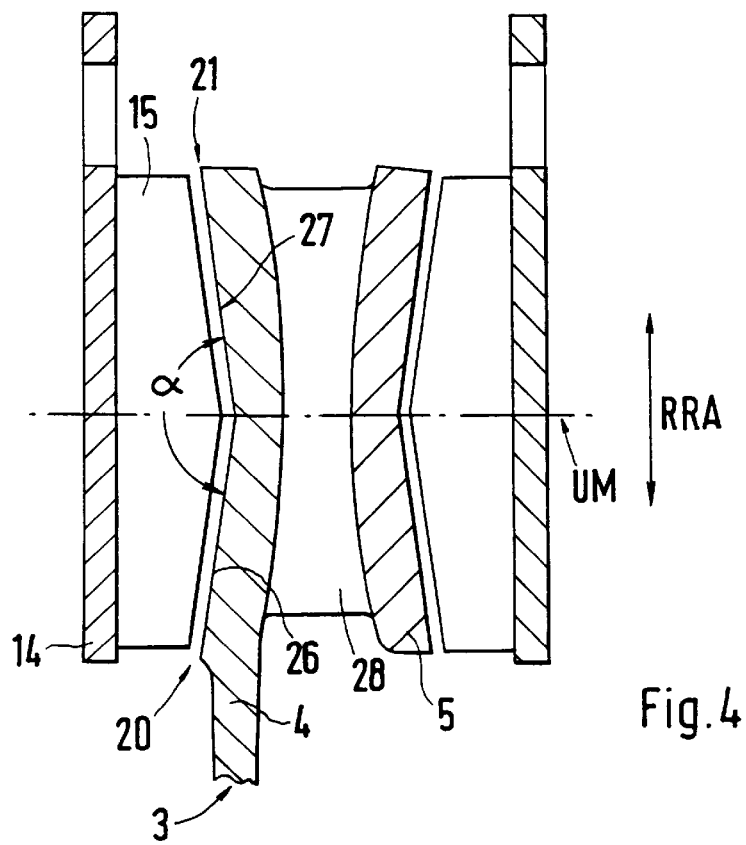
FIG. 4 is a view corresponding to FIG. 3.

According to FIG. 1, in the cross-sectional view, the concavity of the brake disk surface 18 is formed by a radius R. In FIG. 3, the concavity of the brake disk surface 18 is illustrated as an arbitrarily arched curve 23 which, for example, in a central area adjacent line UM, is flatter than in marginal areas 24, 25. Furthermore, the concavity may also be formed by straight lines 26, 27 extending at an obtuse angle α with respect to one another (i.e., conical surfaces).

FIG. 1 shows that the friction ring half 4 as well as the friction ring half 5 have concave brake disk surfaces 18, 18'. It is also contemplated to construct the brake disk surface 18 to be concave and the brake disk surface 18' to be plane.

Passages 28 are provided between the friction ring halves 4 and 5. The friction ring halves 4 and 5 may be provided with a plurality of passage 29 which are used to improve the wet response behavior and to dissipate heat (FIG. 3).

The wall thickness WDV of the friction ring half 5 (FIG. 3) may vary with respect to the continuous wall thickness WDK, in the radial direction RRA. The wall thickness WDV is preferably larger in the area of the friction circumference line UM than in the remaining area; that is, viewed from the direction of the friction circumference line UM, the wall thickness decreases toward the center and toward the outer side of the brake ring half 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Disk brake, for a vehicle, comprising:
a brake disk having a concave brake disk surface; and
a lining device supported on a caliper, said lining device having a convex brake lining surface facing said concave brake disk surface of said brake disk,
wherein during a braking operation, said brake disk surface and said brake lining surface engaae each other in a noise-reducing form closure, and
wherein a concavity factor KF of the brake disk surface is defined according to the following equation:

$$KF = \frac{K * 100}{H}$$

wherein K is the axial distance between an outer periphery of the brake disk surface and a largest indentation of the brake disk surface, and H is the height of the brake lining surface;
wherein said concavity factor KF is selected to be greater than or equal to 3.

2. Disk brake according to claim 1, wherein a guiding factor F of the form closure between the brake lining surface and the brake disk surface is defined according to the following equation:

$$F = \frac{LG}{H}$$

wherein LG is the geometrical brake lining length, and H is the height of the brake lining surface;
wherein said guiding factor F is selected to be greater than or equal to 1.8.

3. Disk brake according to claim 1, wherein an effective brake lining surface length LW of the form closure between the brake lining surface and the brake disk surface satisfies the following equations:

$$LW \approx 0.7 * LG$$

$$LW > \frac{UM}{N}$$

wherein LG is the geometrical brake lining length, UM is the central friction circumference line of the brake disk surface:, and N is the number of vibration nodes.

4. Disk brake according to claim 2, wherein an effective brake lining surface length LW of the form closure between the brake lining surface and the brake disk surface satisfies the following equations:

$$LW \approx 0.7 * LG$$

$$LW > \frac{UM}{N}$$

wherein LG is the geometrical brake lining length, UM is the central friction circumference line of the brake disk surface, and N is the number of vibration nodes.

5. Disk brake according to claim 1, wherein said concave brake disk surface and said convex brake lining surface are each defined by a radius of curvature.

6. Disk brake according to claim 1, wherein said concave brake disk surface and said convex brake lining surface are each defined by an arbitrarily arched curve.

7. Disk brake according to claim 1, wherein said concave brake disk surface and said convex brake lining surface are defined by respective straight lines which extend at an obtuse angle a with respect to each other.

8. Disk brake according to claim 1, wherein said concave brake disk surface and said convex brake lining surface are conical.

9. Disk brake according to claim 1, wherein said brake disk further comprises, on a side opposite said concave brake disk surface, a second brake disk surface, and further comprising a second brake lining device, said second brake lining device having a second brake lining surface facing said second brake disk surface.

10. Disk brake according to claim 9, wherein said second brake disk surface is concave and said second brake lining surface is convex.

11. Disk brake according to claim 9, wherein said second brake disk surface and said second brake lining surface are planar.

12. Disk brake according to claim 1, wherein said brake disk comprises a pair of space friction ring halves, and wherein at least one passage is provided between the spaced friction ring halves.

13. Disk brake according to claim 12, wherein a wall thickness of the friction ring halves varies in a radial direction.

14. Disk brake according to claim 13, wherein the wall thickness proximate a central friction circumference line of the friction ring halves is larger than in a remaining area.

15. Disk brake according to claim 1, wherein the concave brake disk surface and the convex brake lining surface are respective curved surfaces.

16. Disk brake, for a vehicle, comprising:

a brake disk having a concave brake disk surface; and a lining device supported on a caliper, said lining device having a convex brake lining surface facing said concave brake disk surface of said brake disk, wherein during a braking operation, said brake disk surface and said brake lining surface engage each other in a noise-reducing form closure, and wherein a guiding factor F of the form closure between the brake lining surface and the brake disk surface is defined according to the following equation:

$$F = \frac{LG}{H}$$

wherein LG is the geometrical brake lining length, and H is the height of the brake lining surface; and wherein said guiding factor F is selected to be greater than or equal to 1.8.

17. Disk brake according to claim 16, wherein an effective brake lining surface length LW of the form closure between the brake lining surface and the brake disk surface satisfies the following equations:

$$LW \approx 0.7*LG$$

$$LW > \frac{UM}{N}$$

wherein LG is the geometrical brake lining length, UM is the central friction circumference line of the brake disk surface, and N is the number of vibration nodes.

18. Disk brake for a vehicle, comprising:

a brake disk having a concave brake disk surface; and a lining device supported on a caliper, said lining device having a convex brake lining surface facing said concave brake disk surface of said brake disk;

wherein an effective brake lining surface length LW of the form closure between the brake lining surface and the brake disk surface satisfies the following equations:

$$LW \approx 0.7*LG$$

$$LW > \frac{UM}{N}$$

wherein LG is the geometrical brake lining length, UM is the central friction circumference line of the brake disk surface, and N is the number of vibration nodes (SK).

19. Disk brake according to claim 18, wherein during a braking operation, said brake disk surface and said brake lining surface engage each other in a noise-reducing form closure.

* * * * *